Figure 1:
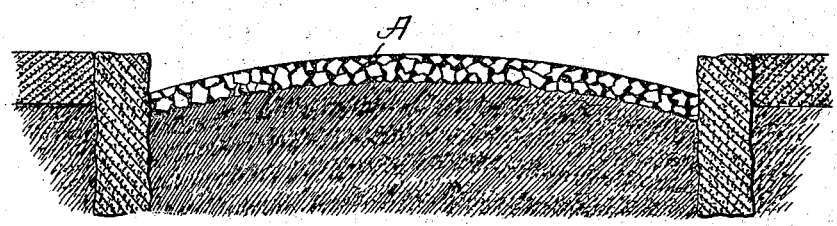

No. 695,421. Patented Mar. 11, 1902.

F. J. WARREN.
PAVEMENT.
(Application filed Jan. 10, 1902.)

(No Model.)

UNITED STATES PATENT OFFICE.

FREDERICK J. WARREN, OF NEWTON, MASSACHUSETTS.

PAVEMENT.

SPECIFICATION forming part of Letters Patent No. 695,421, dated March 11, 1902.

Application filed January 10, 1902. Serial No. 89,162. (No specimens.)

*To all whom it may concern:*

Be it known that I, FREDERICK J. WARREN, a citizen of the United States, and a resident of Newton, in the county of Middlesex and State of Massachusetts, have invented a new and useful Improvement in Street Pavements or Roadways, of which the following is a full, clear, and exact description, reference being had to the accompanying drawings, forming a part of this specification, in explaining its nature.

The invention is an improvement upon that described in my Letters Patent of the United States No. 675,430, dated June 4, 1901, for an improvement in pavements or roadways. In said patent I have described as my invention and claimed a bituminous macadam section of a pavement having a wearing-surface which is stony rather than bituminous, in which there is combined substantially the largest practicable quantity of graded mineral which can be included within the limits of the wearing course or section to be constructed, with the smallest practicable quantity of bituminous cement which can be used in coating the mineral, filling the voids of the structure, and staying and uniting its elements. I have also indicated in said patent the sizes of the mineral (stony) pieces which I preferred to use and the proportions which the various sizes should bear to each other to secure the solidity of base desired within the limits of the course and have stated that such an association of mineral pieces largely eliminated voids between them and decreased the aggregate area of surface to be coated, and thus required the use of substantially the smallest practicable quantity of bituminous cement for coating the surface and filling such voids as remained. I have since ascertained that bituminous cement thus confined in the voids of such a body of mineral so much larger in volume than it has its flexibility and life preserved to a remarkable degree and so that the strength of its union with the pieces of mineral increases with the age and use of the pavement, and an elasticity of the section to traffic and wear is obtained which not only does not injure the structure, but, on the contrary, seems to strengthen it and endow it with greater vitality and conformability to the conditions of wear. Not only this, but the area of bituminous surface exposed to the action of the weather is so decreased by the fact that so large a part of the surface is stony that the disintegrating effect of atmospheric influences upon the entire body of cement is very remarkably decreased. I have now discovered that for some uses a different grading of the mineral may be had and yet a desirable result secured, and while I believe that this and all gradings which will produce the effect described are covered by the terms of my said patent it is not specifically stated and claimed therein. In the said patent I have indicated that to secure stability in the metal elements of the course combined with the elimination of voids it is desirable that the elements shall be of at least three grades, as to size, between a powder and a size one-half inch in diameter and over. I have since discovered that for certain purposes the stability of the metal elements and the necessary elimination of voids may be obtained by dispensing with the use of the grades or elements of the intermediate size and that a very desirable result can be obtained by the use of the larger elements combined with the smaller elements, as though practically two of the three grades mentioned in said patent were used.

In practicing my invention I take metal elements from about a half-inch in diameter to about three inches in diameter and combine with them metal elements which are about one-tenth of an inch in diameter or less and intimately associate them together uniformly and in prearranged proportions in order that the fine elements may have a definite relation to the coarse and so that they may fill the interstices in and about the coarse elements uniformly from element to element and curb to curb or edge to edge, and so that the metal course shall comprise the relatively large elements supported, combined, and associated with the relatively small elements in a firm, compact, stable, continuous body or layer of practically uniform thickness throughout the course. The metal section of the course thus proportioned is then intimately mingled and combined with a uniting and combining weatherproof vehicle or medium, like asphalt or any of its products or coal-tar or any of its products or a mixture, and so that all the elements of the metal course shall be bound together, the interstices remaining filled by it and the whole converted into a solid, coherent, continuous body or section of the pavement, in which the mineral elements form by far the largest part of the course, the intention being that the wear shall be received by the mineral elements and that the uniting vehicle shall act more in the capacity of combining, holding, and weatherproofing rather than as a means for receiving the principal wear, and in this regard my present improvement follows the invention of my said patent.

I would here say that one of the great causes of the failure of bituminous pavements is the use of mineral mixtures of so fine a grade and so frictionless a character that separate stability of the mineral itself is not secured and the voids not sufficiently reduced to permit of the best use and protection of the bituminous cement. Moreover, such fine mineral mixtures are not calculated to relieve the bituminous cement of wear, the cement forming a large part of the actual wearing-body of the pavement and being thereby subjected to the disintegrating action of the atmosphere which my invention largely avoids.

I will now describe the invention in connection with the drawings, where—

Figure 2:
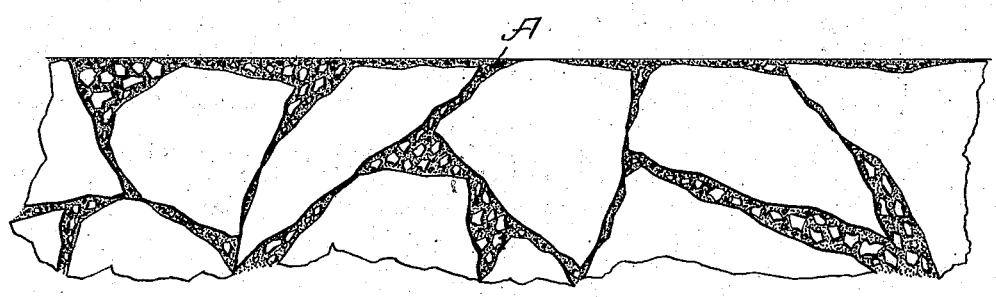

Figure 1 is a view in cross vertical section of a street-pavement having the features of my invention. A conventional foundation only is shown. Fig. 2 is a view in vertical section, enlarged.

In the drawings the figures represent a vertical section of a pavement having the features of my invention.

A indicates the upper or wearing section, and it is composed of the mineral elements described combined with each other to form the solid, stable, mineral base specified and the elements of which are coated and the voids thereof filled by bituminous cement, which unites, stays, holds, and weatherproofs the entire section, the whole producing a bituminous macadam course having a wearing-surface in which the stone largely predominates and takes the principal wear.

I would not be understood as limiting the invention to the size of the larger and smaller mineral elements described, as it is obvious that some latitude in this may be permitted and the invention still be practiced.

I claim—

A wearing layer of a street sheet-pavement composed of a dense mineral body consisting only of relatively large elements, one-half inch and upward in diameter, and relatively small elements, one-tenth of an inch in diameter and less, having predetermined proportions and intimately and uniformly associated throughout the body to eliminate voids, provide stability and a wearing-surface and a uniting weatherproof, bituminous vehicle intimately associated with all the mineral elements serving to combine and unite them, fill the voids remaining unfilled and to form with the mineral body a solid, stable, homogeneous, tenacious, elastic, bituminous wearing layer.

FREDERICK J. WARREN.

Witnesses:
F. F. RAYMOND, 2d,
J. M. DOLAN.